March 28, 1950   J. D. WARNER   2,501,750
AMPHIBIOUS VEHICLE WHEEL RETRACTING MECHANISM Filed April 30, 1947   2 Sheets-Sheet 1

Inventor
Joseph D. Warner

By *Clarence A. O'Brien and Harvey B. Jacobson*
Attorneys

Inventor
Joseph D. Warner

Patented Mar. 28, 1950

2,501,750

UNITED STATES PATENT OFFICE 2,501,750

AMPHIBIOUS VEHICLE WHEEL RETRACTING MECHANISM

Joseph D. Warner, Brownsville, Tex.

Application April 30, 1947, Serial No. 744,847

2 Claims. (Cl. 280—44)

The present invention relates to new and useful improvements in amphibious vehicles and more particularly to a water craft provided with retractable wheels and a trailer hitch whereby the water craft may be towed by an automobile or other motor vehicle to and from a body of water without requiring the lifting of the water craft onto a trailer or onto the top of the motor vehicle, as now commonly practiced.

An important object of the present invention is to provide means for easily and quickly moving the wheels into and out of retracted positions.

Another object of the invention is to provide retractable wheels mounted at the sides of the water craft together with mechanism for simultaneously moving the wheels into and out of retracted positions and also providing detachable brace means connecting the wheels to each other to rigidly support the same when traveling over a highway and to prevent accidental retracting movement thereof.

A further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figures 5, 7:
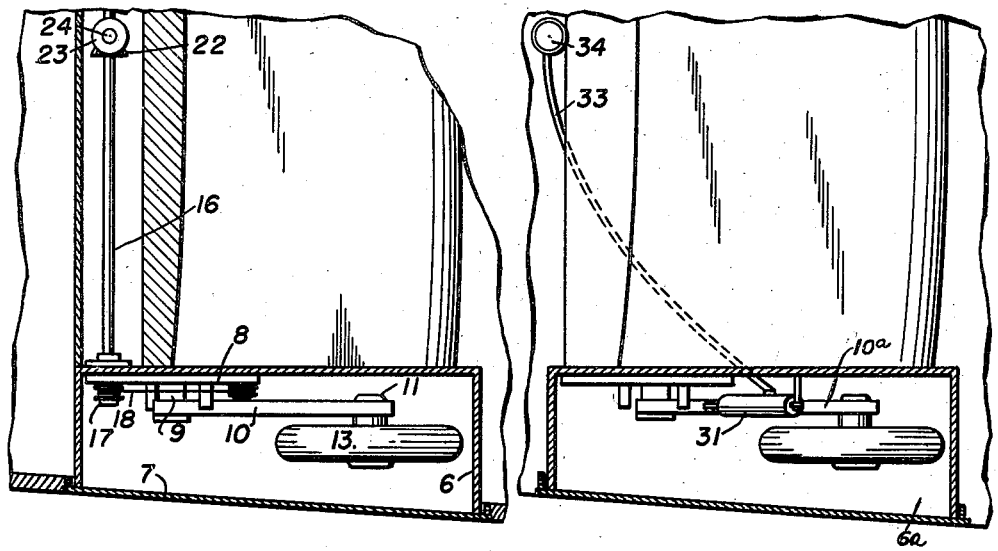
Figure 5 is an enlarged fragmentary sectional view showing one of the wheel pockets.
Figure 7 is a sectional view of one of the wheel pockets and showing the wheel equipped with hydraulic raising and lowering mechanism.

Referring now to the drawings in detail, and first with respect to the form of the invention illustrated in Figures 1 to 6, inclusive, the numeral 5 designates a boat having wheel pockets 6 formed at each side adjacent the stern of the boat, the pockets being open at the bottoms thereof and also being open at one side and provided with a water-tight side cover 7 which is flush with the sides of the boat, as shown to advantage in Figure 5 of the drawing. The top of each pocket is air and water tight to trap air therein and thus add to the buoyancy of the boat when placed in water.

To the inner vertical wall of each of the pockets is secured a plate or bracket 8 having a pivot pin 9 projecting therefrom and on which one end of an arm 10 is pivotally mounted for vertical swinging movement of the arm. A stub axle 11 is carried at the other end of the arm and on which a wheel 12 is journaled having a pneumatic tire 13 mounted thereon, the wheel being arranged for vertical movement into and out of the pocket, as indicated by the full and dotted line positions in Figure 6 of the drawings.

Upper and lower stops 14 and 15 carried by the plate 8 limit the raising and lowering movement of the arm 10 when moving the wheel into its retracted and projected positions.

A transversely extending shaft 16 has its ends journaled in the inner side walls of the pockets 6 and to each end of the shaft is secured a drum 17 having the intermediate portion of a cable 18 wound one or more times thereon. One end of the cable 18 is trained over an upper idler pulley 19 journaled at the forward end of the plate 8 above the arm 10, said end of the cable being attached to the arm by eye 20 or the like.

The other end of the cable is likewise trained over a lower idler pulley 21 carried at the rear portion of the plate 8 below the arm 10 and said last-named end of the cable is also attached to the arm, as shown at 22.

A bevel gear 22 is secured to the shaft 16 and is engaged by a similar gear 23 secured to the lower end of a vertical shaft 24 suitably journaled in the boat and provided with a crank handle 25 at its upper end.

Figure 1:
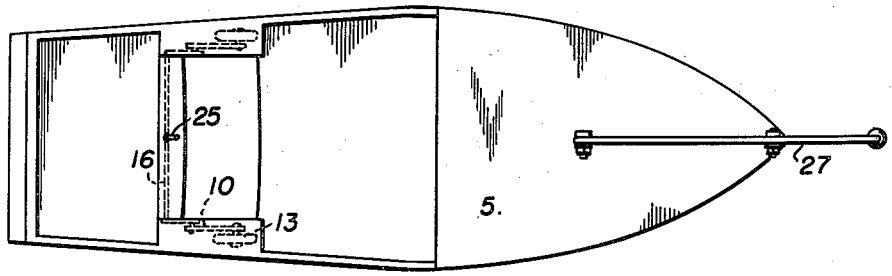
Figure 1 is a top plan view.
Figure 2:
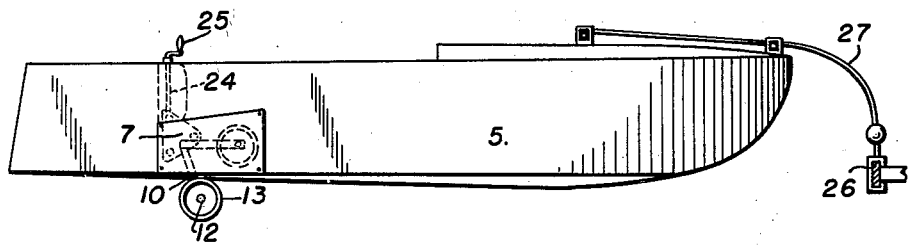
Figure 2 is a side elevational view.
Figure 3:
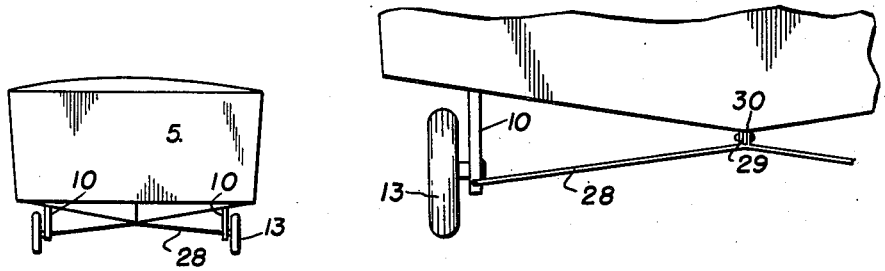
Figure 3 is a rear elevational view showing the wheels in a lowered position for converting the water craft into a trailer.
Figure 4:
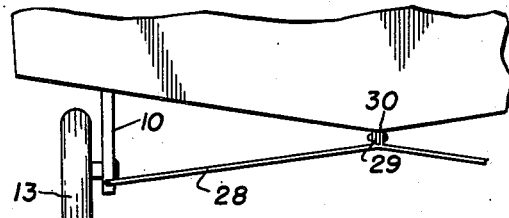
Figure 4 is an enlarged fragmentary rear elevational view showing the brace for the wheels.

Accordingly, by turning the handle 25 to rotate the shafts 24 and 16, the cable 18 will be wound and unwound from the drum 17 to raise and lower the arm 10 and wheel 12 into and out of its retracted position in the pocket 6. By moving the wheels into a projected position, as shown in Figure 2 of the drawing, the boat will be supported thereon, and by attaching the bow of the boat to the rear bumper 26 of an automobile or other motor vehicle by means of a conventional hitch 27, the boat may be towed from place to place.

A transverse brace 28 is provided intermediate its end with an attaching bracket 29 for attaching to the keel 30 of the boat and is attached at its ends to the lower ends of the arms 10 to hold the arms rigid when in their projected position against road jars and to prevent accidental retracting movement of the wheels.

Figures 6, 8:
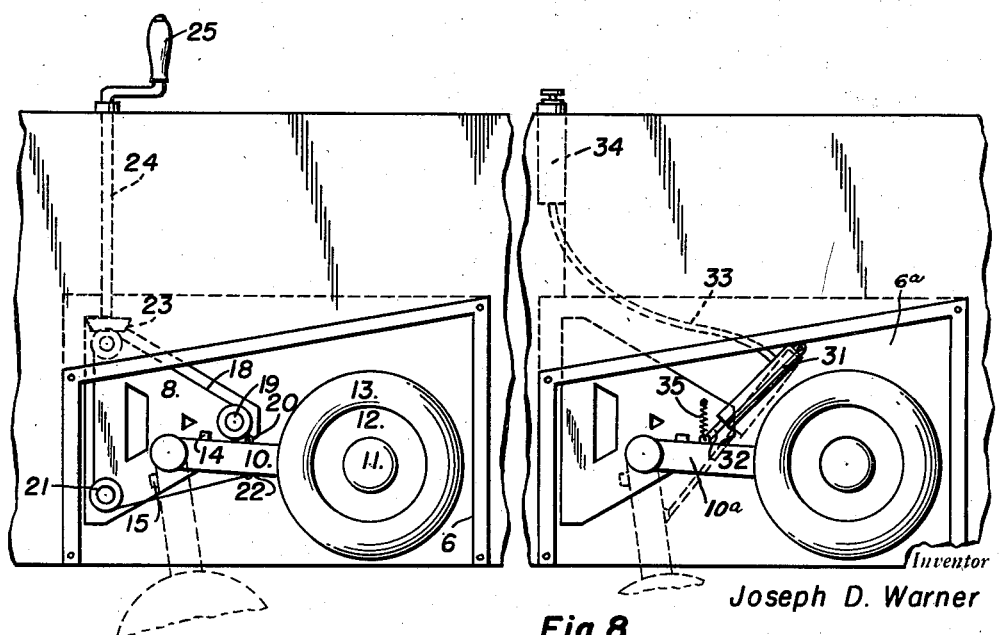
Figure 6 is an enlarged fragmentary side elevational view of the wheel pocket with the cover plate removed therefrom.
Figure 8 is a side elevational view thereof with the cover plate removed.

In the modified construction shown in Figures 7 and 8, the arms 10a are raised and lowered by means of a hydraulic cylinder 31 pivoted at its upper end in the pocket 6a and having a plunger 32 working in the lower end of the cylinder and pivoted to the arm. A pressure supply and release line 33 leads to the cylinder from a conventional hand pump 34.

The fluid pressure supplied to the cylinder 31 will lower the arm into its projected position and hold the arm in such position and a coil spring 35 attached to the arm will raise the arm and wheel when pressure is released.

The buoyancy of the pneumatic tires will also hold the wheels in the pockets when the boat is placed in the water and, in addition, will add buoyancy to the boat.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

What I claim as new is:

1. Retractable ground wheel mechanism for an amphibious vehicle having a pair of open bottom side pockets, said mechanism comprising a pair of arms pivoted at corresponding ends thereof in said pockets for vertical swinging movement, ground wheels on the other ends of said arms for projection out of and retraction into said pockets by swinging of said arms in opposite directions, a cross shaft journalled in said vehicle with end drums fast thereon in said pockets, pulleys in said pockets on opposite sides of said arms, a pair of cables wound intermediate the ends thereof on said drums, said cables being trained over said pulleys with terminals connected to opposite sides of said arms whereby rotation of said shaft in opposite directions will cause said drums to wind and unwind said cables to swing said arms vertically in opposite directions and project and retract said wheels, and manipulative means for rotating said shaft in opposite directions.

2. Retractable ground wheel mechanism for an amphibious vehicle having a pair of open bottom side pockets, said mechanism comprising a pair of arms pivoted at corresponding ends thereof in said pockets for vertical swinging movement, ground wheels on the other ends of said arms for projection out of and retraction into said pockets by swinging of said arms in opposite directions, a cross shaft journalled in said vehicle with end drums fast thereon in said pockets, pulleys in said pockets on opposite sides of said arms, a pair of cables wound intermediate the ends thereof on said drums, said cables being trained over said pulleys with terminals connected to opposite sides of said arms whereby rotation of said shaft in opposite directions will cause said drums to wind and unwind said cables to swing said arms vertically in opposite directions and project and retract said wheels, manipulative means for rotating said shaft in opposite directions, and stops in said pockets intermediate said arms and pulleys for limiting swinging of said arms in opposite directions to correspondingly limit projection and retraction of said wheels.

JOSEPH D. WARNER.

REFERENCES CITED

The following references are of record in the file of this patent:

UNITED STATES PATENTS

| Number | Name | Date |
|---|---|---|
| 1,442,155 | Klemin | Jan. 16, 1923 |
| 1,747,563 | Yonkese | Feb. 18, 1930 |
| 1,794,813 | Watter | Mar. 3, 1931 |
| 2,227,762 | Ronning | Jan. 7, 1941 |
| 2,437,736 | Good | Mar. 16, 1948 |

FOREIGN PATENTS

| Number | Country | Date |
|---|---|---|
| 381,647 | Great Britain | Oct. 13, 1932 |